(12) United States Patent  (10) Patent No.: US 8,731,175 B2
Shaffer et al.  (45) Date of Patent: May 20, 2014

(54) METHOD AND SYSTEM FOR SECURING ACCESS TO INFORMATION IN AN AUTOMATIC CALL DISTRIBUTOR SYSTEM

(75) Inventors: Shmuel Shaffer, Palo Alto, CA (US); Labhesh Patel, San Francisco, CA (US); Cullen F. Jennings, Milpitas, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2088 days.

(21) Appl. No.: 11/359,252

(22) Filed: Feb. 21, 2006

(65) Prior Publication Data

US 2007/0206765 A1  Sep. 6, 2007

(51) Int. Cl.
*H04M 3/00* (2006.01)

(52) U.S. Cl.
USPC ............... 379/265.02; 370/352; 379/265.09

(58) Field of Classification Search
USPC ............ 379/265.09, 265.01–265.04, 265.12, 379/265.11; 709/219; 370/352
See application file for complete search history.

(56) References Cited

U.S. PATENT DOCUMENTS

| | | | | |
|---|---|---|---|---|
| 5,987,116 A | | 11/1999 | Petrunka et al. | 379/265.13 |
| 6,046,762 A | * | 4/2000 | Sonesh et al. | 348/14.11 |
| 6,049,602 A | * | 4/2000 | Foladare et al. | 379/265.04 |
| 6,452,601 B1 | | 9/2002 | Marino et al. | 345/538 |
| 6,473,505 B1 | * | 10/2002 | Khuc et al. | 379/265.01 |
| 6,493,447 B1 | * | 12/2002 | Goss et al. | 379/265.09 |
| 6,493,695 B1 | | 12/2002 | Pickering et al. | 706/47 |
| 6,700,972 B1 | | 3/2004 | McHugh et al. | 379/265.13 |
| 6,823,384 B1 | * | 11/2004 | Wilson et al. | 709/225 |
| 6,868,152 B2 | | 3/2005 | Statham et al. | 379/265.02 |
| 6,970,554 B1 | * | 11/2005 | Peterson et al. | 379/266.1 |
| 2002/0152288 A1 | * | 10/2002 | Hora et al. | 709/219 |
| 2004/0133434 A1 | * | 7/2004 | Szlam et al. | 705/1 |
| 2004/0210658 A1 | * | 10/2004 | Guillermo et al. | 709/227 |
| 2005/0004934 A1 | * | 1/2005 | Elsey et al. | 707/102 |
| 2005/0063530 A1 | * | 3/2005 | Cook et al. | 379/265.09 |
| 2005/0071278 A1 | * | 3/2005 | Simelius | 705/52 |
| 2005/0149364 A1 | * | 7/2005 | Ombrellaro | 705/3 |
| 2005/0213742 A1 | * | 9/2005 | Fukuzawa | 379/265.02 |
| 2006/0029193 A1 | * | 2/2006 | Timmins et al. | 379/88.13 |
| 2006/0245576 A1 | * | 11/2006 | Henry | 379/265.01 |

* cited by examiner

*Primary Examiner* — Antim Shah
(74) *Attorney, Agent, or Firm* — Baker Botts L.L.P.

(57) ABSTRACT

A method for granting access to secure information includes receiving from a caller a call for connection with one of a plurality of agents, distributing the call to the agent of the plurality of agents, initiating an active communication session between the caller and the agent for handling the call, and granting to the agent access to the secure caller information using a plurality of access authentication information that includes an active communication session between the caller and the agent.

32 Claims, 3 Drawing Sheets

METHOD AND SYSTEM FOR SECURING ACCESS TO INFORMATION IN AN AUTOMATIC CALL DISTRIBUTOR SYSTEM

TECHNICAL FIELD OF THE INVENTION

This invention relates in general to communication systems and, more particularly, to a method and system for securing access to information in an automatic call distributor system.

BACKGROUND OF THE INVENTION

Automatic call distributors (ACDs) and call centers or other contact centers typically include systems designed to match incoming requests for service, for example a telephone call or an e-mail, with a resource that is able to provide that service, such as a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; (iv) connect the call to an agent as soon as the agent is available; and (v) grant the available agent access to the customer information database(s) to complete the transaction.

Some customers fear that there may be an opportunity for fraud when secure customer information is made available to call centers. For example, identity theft could occur when a call center agent uses secure information from customer databases without customer's knowledge for a fraudulent use. Providing access to secure information in customer databases has become a growing concern of customers that reduces the willingness of customers to engage in commerce with contact centers. Security is of particular concern to customers as companies outsource call centers to third parties such as hosted call centers. In hosted call centers, a call from a customer may be answered by a hosting company with agents in foreign countries. The customer may provide personal, account, and other confidential information to an agent residing outside the country. In these cases, the agent may not be employed by the company that the customer is completing the transaction with. Call centers concerned about losing customers are attempting to address these security concerns.

Some banking systems require the presence of multiple physical keys before granting access to customer information (e.g. opening a safety deposit box). In this example, the customer has one key and the bank employee has another key. Both the customer and the bank employee must be present at the same time to open the safety deposit box.

Some ACD systems and call centers grant agents access to caller information based on caller identification (id) information. When a customer calls, the ACD system receives the caller id and gives the agent handling the call automatic access to the customer's information based on the caller id. Typically, the agent gets the information in the form of a screen popup. The customer is then transferred to the agent. If the customer is transferred to a third party, the third party automatically gets the information, and the agent's screen is blanked out. When the customer hangs up, the agent may keep the information to complete the transaction after the call.

SUMMARY OF THE INVENTION

The present invention provides a method and system for securing access to caller information in an ACD system that substantially eliminates or reduces at least some of the disadvantages and problems associated with previous methods and systems.

In accordance with one embodiment, a method for granting access to secure caller information may include receiving from a caller a call for connection with one of a plurality of agents. This method may also include distributing the call to an agent of the plurality of agents and initiating an active communication session between the caller and the agent for handling the call. This method may also include granting the agent access to secure caller information using a plurality of access authentication information. The plurality of access authentication information may include the active communication session between the caller and the agent. In another embodiment, the plurality of access authentication information may also include caller authenticating credentials received from the caller and/or agent authenticating credentials received from the agent. In another embodiment, this method may include communicating to the caller actions performed by the agent in handling the secure caller information.

In one embodiment, this method may include disconnecting the active communication session between the caller and the agent and consequently removing from the agent the access to the secure caller information. In another embodiment, granting access to the secure information may include establishing a database communication session between the agent and a database having secure caller information. In this embodiment, removing from the agent access to secure caller information includes disconnecting the database communication session between the agent and the database. In another embodiment, removing access to the secure caller information may also include clearing secure caller information from a display associated with the agent. In another embodiment, disconnecting the active communication session between the caller and the agent may also include completing the transaction associated with the call.

In one embodiment, this method may also include receiving a disconnect command from the caller to disconnect the agent's access to the secure caller information and in response to receiving the command, removing agent's access to the secure caller information. In response to removing agent's access, this method may include clearing the secure caller information from a display associated with the agent.

In accordance with another embodiment, a method for granting access to secure caller information may include receiving from a caller, a call for connection with one of a plurality of agents and caller authenticating credentials associated with the caller. This method may also include distributing the call to an agent of the plurality of agents and initiating an active communication session between the caller and the agent for handling the call. This method may also include generating a session key for the communication session between the caller and the agent. The session key may expire at the end of the communication session. This method may also include providing the agent with access to secure caller information of the caller using the caller authenticating credentials and the session key.

In accordance with another embodiment, a system for granting access to secure caller information includes an interface operable to receive from a caller a call for connection with one of a plurality of agents. The system also includes a controller operable to distribute the call to an agent of the plurality of agents and initiate an active communication session between the caller and the agent for handling the call. The controller is further operable to grant to the agent access to secure caller information using a plurality of access authentication information. The plurality of access authentication information includes the active communication session between the caller and the agent.

Technical advantages of particular embodiments include methods and systems for securing access of call centers to customer information thereby improving the confidence of customers in conducting business with call centers. Particular embodiments may allow agents access to customer information only when the customer is in a communication session with the ACD agent. Conversely, embodiments may terminate access of the ACD agent to the customer information when the session is terminated. In addition, customers may be informed of all actions of the ACD agent concerning the customer information. Some examples may include the customer being informed of the screen/information viewed by the agent, of the control keys which the agent presses (e.g. print screen), and of the transactions which the agent performs. Thus, the security of customer information at ACD systems and contact centers is enhanced as particular embodiments provide additional barriers to accessing customer information databases.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
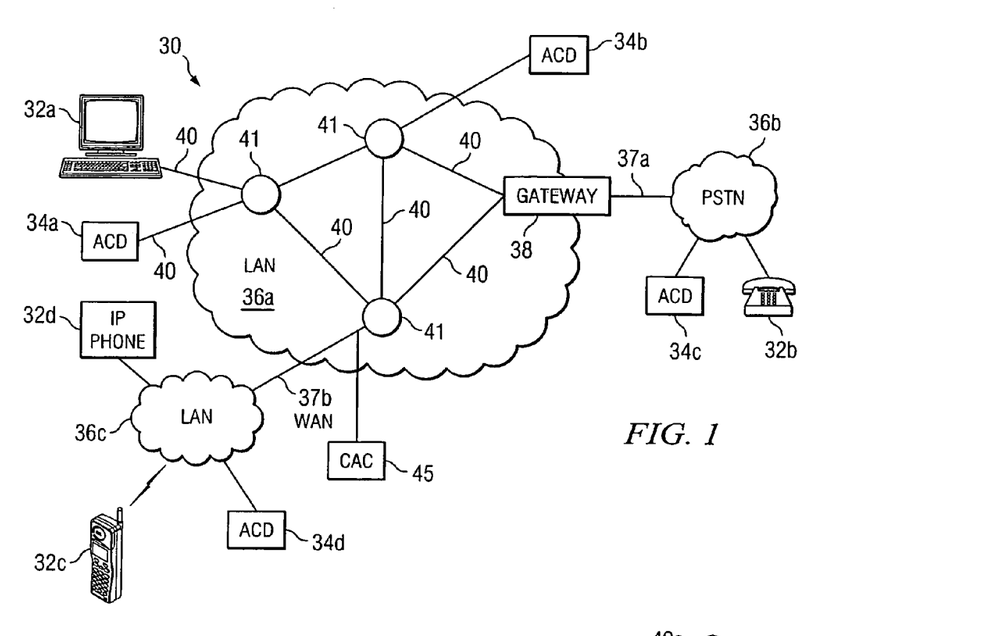
FIG. 1 illustrates a communication system including a plurality of endpoints operable to establish communication sessions between each other and/or a plurality of ACDs, in accordance with a particular embodiment of the present invention.

FIG. 1 illustrates a communication system 30 including a plurality of endpoints 32a-32d having the ability to establish communication sessions between each other and/or ACDs 34a-34d, using one or more of communication networks 36a-36c. ACDs are specialized communication systems designed to route incoming calls to available agents, so that calls are properly and/or evenly distributed. For the purposes of this specification, an "automatic call distributor" or "ACD" shall refer to any combination of hardware, software and/or embedded logic which is operable to automatically distribute incoming calls. ACDs may comprise hosted or non-hosted call centers. "Calls" shall include requests for service transmitted using any audio and/or video means, including signals, data or messages transmitted through voice devices, text chat, web sessions, facsimile, instant messaging (IM) and e-mail.

ACDs may include call centers or other contact centers that receive incoming customer calls for distribution to agents and that place calls to customers. Call centers may stand alone or be linked to other call centers, contact centers, or other computer networks. Call centers may be multi-media enabled. Multi-media call centers enable callers to interact with agents and supervisors using voice, video, e-mail, IM, web sharing, and other communication methods. A call center's ability to augment the voice interaction between agents and callers increases the productivity of the contact center. With the proliferation of session initiation protocol (SIP), the ability of call centers to support multi-media has been enhanced because SIP natively provides support for multi-media interactions. Furthermore, the availability of internet protocol (IP) telephone devices with large, user friendly screens allows applications to interact with end users more efficiently.

In particular embodiments, the ACD system provides a method of granting an agent access to secure caller information while the caller is engaged in an active communication session with the agent. Secure caller information may include sensitive and/or confidential information such as identity, financial, and health information. In addition, maintaining the confidentiality of caller information may be required by law such as some health information under the Health Insurance Portability and Accountability Act of 1996 ("HIPAA"). This method of granting access to secure information may improve customer confidence in conducting business with call centers. Customers that fear fraudulent use of their information in call centers may feel more comfortable to restricting access to their information to the time the customer is engaged with the call center. When the communication session becomes inactive such as when the caller disconnects, access to customer information may be removed. The ACD system may also inform the customer of agent's actions in handing customer information during the ongoing communication session. If the customer feels uncomfortable with the actions taken in handling the information, the customer may remove access to the information. As an additional safeguard, customers may also prefer to prevent access to certain secure information unless explicit permission has been granted. Thus, some embodiments improve the security of customer information at call centers by providing additional barriers to accessing caller information in customer information databases.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38 and communication networks 36b-36c. Therefore, a user of endpoint 32a is provided with access to endpoints 32b-32d and ACDs 34a-34d. Nodes 41 may include any combination of network components, gatekeepers, Controllers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d and/or gateway 38 may be any combination of hardware, software, and/or encoded logic that provides communication services to a user. It will also be recognized that endpoints 32a-32d may be multimedia enabled with a set of multi-media capabilities. For example, endpoints 32a-32d may be capable of including a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
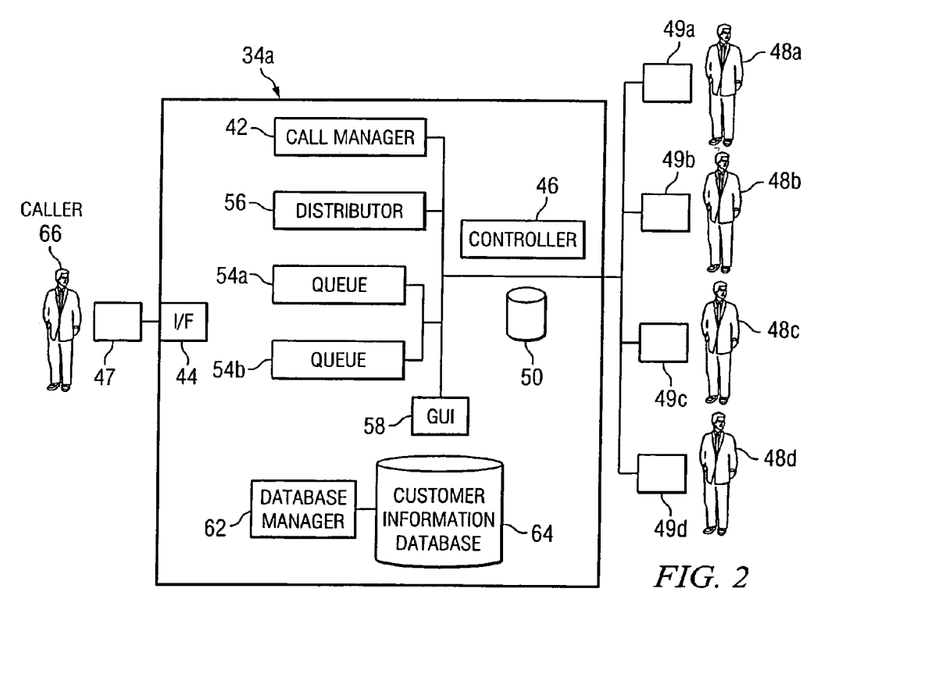
FIG. 2 illustrates an ACD of FIG. 1 in more detail, illustrating aspects of an embodiment of the present invention.

FIG. 2 illustrates ACD 34a in more detail, illustrating aspect of an embodiment of the present invention. In the illustrated embodiment, ACD 34a includes call manager 42, interface or input ports 44, controller 46, memory module 50, queues 54, distributor 56, graphical user interface (GUI) 58, database manager 62, and customer information database 64. Interface or input ports 44 couple ACD 34a with communication network 36a.

GUI 58 presents information to agents 48 and other users of ACD 34a. In particular embodiments, GUI 58 may present information to agents through their respective endpoints 49. In some embodiments, information may be presented through one or more electronic bulletin boards within sight of the agents. Any suitable information may be presented by GUI 58, such as information to help increase the efficiency of ACD 34a and its users and agents.

Memory module 50 may be any form of volatile or nonvolatile memory including, without limitation, magnetic media, optical media, random access memory (RAM), read-only memory (ROM), removable media, or any other suitable local or remote memory component.

Customer information database 64 may include any hardware, software, firmware, or combination of the preceding for storing, saving, and retrieving information. Also, customer information database 64 may use any of a variety of data structures, arrangements, and compilations to store and facilitate retrieval of information. In one embodiment, customer information database 64 may include secure and non-secure caller information comprising any information suitable for use in conducting transactions with call centers. For example, caller information in customer database 64 may include identification, authentication, and account information. It should be understood that customer information database 64 in accordance with various embodiments may be associated with any suitable number of databases, directory services, and memory modules 50 inside and/or outside ACD system 34*a*.

Database manager 62 may be any combination of hardware, software, and/or encoded logic. In various embodiments, database manager 62 or other ACD system 34*a* module may grant, maintain, and/or terminate access to caller information in customer information database 64 to system users. In certain embodiments, database manager may be located within ACD system 34*a* while in other embodiments database manager may be distributed throughout communication system 30. It should also be understood that database manager 62 in accordance with various embodiments may be associated with controller 46. In particular embodiments, database manager 62 may maintain a listing, table, or other organization of information about callers, agents, and other users of system. The information may include a name or other identifier for each agent, caller, and other user of the system. The information may include authenticating information such as a password or PIN number. ACD 34*a* may also manage and track the communication sessions and the activity within the communication sessions such as whether agents 48 are logged on/off, away from position, or accessing database.

The illustrated embodiment also includes agents 48, endpoints 47 and 49, and caller 66. Agents 48*a*-48*d* may use endpoints 49*a*-49*d* to communicate with caller 66 using ACD system 34*a* to facilitate the communication. Caller 66 may use endpoint 47 to communicate with agents 48 using ACD system 34*a* to facilitate the communication. Such communication between the caller and the ACD system may use one or more communication networks as described in FIG. 1 which may include one or more WANs or LANs as indicated above. Endpoints 47 and 49*a*-49*d* may be similar to one or more of the endpoints 32*a*-32*d* described above with respect to FIG. 1, such as IP phone endpoint 32*d*. It should be understood that endpoints 49 may be coupled to ACD 34*a* through one or more communication networks, such as the communication networks described above with respect to FIG. 1 which may include one or more WANs or LANs as indicated above. It should also be understood that ACDs in accordance with various embodiments may be associated with any suitable number of agents 48, callers 66, and endpoints 47 and 49.

Call manager 42 maintains information on agents 48 and other users of communication system 30 and facilitates communication among users. Call manager 42 may be any combination of hardware, software, and/or encoded logic and is used by ACD 34*a* to manage agents 48 and other users of communication system 30. In particular embodiments, call manager 42 may maintain a listing, table, or other organization of information about agents 48 and other users of system 30. The information may include information access policies. The information may also include a name or other identifier for each agent 48 and other user. The information may also include contact information such as phone numbers and email addresses for the agents 48 and other users of system 30. For identifying agents 48*a*-48*d* that may be contacted or otherwise recruited to handle incoming calls received by the ACD 34*a*, call manager 42 may also maintain information identifying the skill sets, roles, and permission levels to access information of users of system 30. For example, the information may identify whether a user of system 30 is a call agent or performs other tasks within the organization.

As is the case with other components of ACD 34*a*, in particular embodiments the functionality of call manager 42 may be performed by hardware, software, logic embodied in a computer readable medium, or encoded logic distributed throughout a communication network coupled with the ACD.

Controller 46 may authenticate system users, generate keys, generally facilitate communication among system users, and provide for the granting of secure access to caller information as discussed herein. Controller 46 may be any combination of hardware, software, and/or encoded logic and is used by ACD 34*a* to manage agents 48 and other users of system 30.

In particular embodiments, when an incoming call is received by controller 46, controller 46 may authenticate the caller. For example, controller 46 may prompt caller for a PIN number. Once the caller is authenticated, controller 46 may generate a caller key $K_c$. Controller 46 then determines if a suitable agent 48 is available to receive the call. If a suitable agent 48 is available to receive the incoming call, distributor 56 may distribute the call to such agent for handling. For example, distributor 56 may connect a voice or video call with the available suitable agent. If a suitable agent is not available, the call may be placed into a queue 54 in order to wait for suitable agent(s) 48. In this embodiment, ACD 34*a* has two queues 54; however other embodiments of the present invention may have none, one or more than two queues 54. The selection of which queue 54 to place an incoming call may depend on the type of customer making the call, the type of service requested in the call or any other characteristic or condition relating to the call or to ACD 34*a*. While a customer is waiting for agent 48, ACD 34*a* may perform one or more of several functions including feedback or other data collection from the user, playing of pre-recorded messages, or other automated process.

As soon as suitable agent 48 becomes available, distributor 56 may distribute the call to the suitable agent 48 after a self service session. Controller 46 may prompt agent 48 for authenticating information at this time or at another reasonable time such as when logging into ACD system 34*a*.

Once the communication session between agent 48 and the caller becomes active, controller 46 generates a session key $K_s$ to enable agent 48 to access secure caller information. This session key $K_s$ may be destroyed when the session becomes inactive and/or the caller or other system user chooses to destroy the session key $K_s$. In one embodiment, database manager 62 grants agent 48 access to customer information database 64 when the session key $K_s$ is present. It should also be understood that communication sessions in accordance with various embodiments may be conducted in any suitable manner, such as through IM, short message service (SMS), e-mail, web form sharing, phone, in-band or out-of-band DTMF signals, or soft keys.

Some embodiments of the ACD system in accordance with this invention may work similarly in principle to the way a safety deposit box is opened. In the case of a safety deposit box, a bank employee, a customer, and the safety deposit box must be present to gain access to the contents of the safety deposit box. In addition, the customer and the bank employee must have their keys present. Similarly, this ACD system 34*a* may require access authentication information in the form of encryption keys to authorize access to agent of caller information in certain customer information database 64. In some cases, accessing customer database 64 may include retrieving, modifying, and saving information in databases to complete various transactions for the caller. For example, a caller may want to pay a portion of a credit card balance. In this example, agent 48 may retrieve caller's account information including a balance due from a customer database. To complete the transaction, agent 48 may retrieve the balance due, credit the account by the amount paid, and save the new balance in caller's account information in customer database 64.

Other embodiments in accordance with this invention may also include rule-based logic that restricts or grants access to designated information in customer information database 64. For example, agent 48 may only be granted access to caller's secure credit information with explicit permission from the caller. In this example, the caller may be prompted to grant permission when credit information becomes necessary to complete the transaction. In another example, agent 48 may only be granted access to caller information if a supervisor is present in the active communication session. In a third example, a nurse agent 48 may be granted access to a patient's information provided that a doctor is present in the communication session. In yet another example, an agent 48 or other system user may have a super user key which gives the user access to customer database 64 regardless of whether an active communication exists.

One embodiment of the ACD system may require that certain participants be in an active communication session before the agent or other system user is granted access to caller information in customer database 64. Participants may include agents, callers, databases, other users of system 30, and other suitable participants in system 30. In some cases, the presence of participants in the active communication session may be required to maintain access to customer database 64. The presence of the participants in the communication session may be to form a symmetric or asymmetric encryption key. In one case, the key may be a session key $K_s$ that is only valid while the communication session between the participants remains active. The session may be become inactive for any one or combination of suitable reasons such as one of the participants leaves the communication session, one of the participants stops communicating, the call is interrupted, the call ends, and/or customer database 64 goes offline. In some cases, agent 48 may only be granted access to information in customer database 64 for that particular caller during that particular call. Thus, agent 48 may not be able to exploit the availability of customer database 64 to access other customer's information.

Other embodiments of ACD system 34a in accordance with the invention may provide the caller with information regarding the handling of their confidential information so that the caller can make informed decisions to terminate the communication session and/or agent's access to caller information in suitable manner. Thus, particular embodiments of this invention improve securing confidential caller information at call centers and prevent the unauthorized review of sensitive information so that callers can execute their business with confidence that their information will not be misused.

It will be recognized by those of ordinary skill in the art that ACD system 34a is merely one example configuration of an ACD for handling calls in accordance with particular embodiments. ACD 34a may include any number of interfaces, call managers, controllers, feedback managers, database managers, databases, processors, memory modules, distributors, and queues to accomplish the functionality and features described herein. For example, although ACD 34a is illustrated and described as including call manager 42, interface 44, controller 46, memory module 50, two queues 54, distributor 56, database manager 62, customer information database 64, interface 44, agents 48, endpoints 49, and GUI 58, these components and other desired components for performing the above described functionality may be centrally located (local) with respect to one another, or distributed throughout communication system 30. In addition, one or more components of ACD 34a may work together in performing various functionalities described herein.

FIGS. 3A through 3D illustrate several example schematics for granting access to secure caller information in customer information database 64 using access authentication information, in accordance with particular embodiments. Access authentication information may include any type of authentication information required by ACD system 34a to grant access to agent 48 or other user of the system access to secure information in the ACD system 34a. In some embodiments, access authentication information may include at least one session key $K_s$. In some embodiments, $K_s$ is an encryption key. In other embodiments, access authentication information may include other keys such as an agent key $K_a$, a caller key $K_c$, and/or a database key $K_{db}$. The keys may be of any form or type. In some embodiments, the keys may be encryption keys. An encryption key is a device used to decrypt data in an encrypted unreadable format to a decrypted readable format. The encryption keys may be of any form or type such as symmetric or asymmetric.

In some embodiments, ACD system 34a may generate a session key $K_s$ when a communication session between participants becomes active. In the illustrated scenarios, for example, the initiation of an active session between a caller 66 and agent 48 generates session key $K_s$. In some embodiments, session key $K_s$ may only be valid and access remain open to agent 48 while the participants remains actively in the communication session. If the communication session becomes inactive, the session key $K_s$ may be destroyed and the access to customer information database 64 may be removed. For example, session key $K_s$ may expire at the end of the call or when the participants stop communicating for a predetermined amount of time. In another example, session key $K_s$ may be destroyed and access to customer information database 64 removed if the communication session is disconnected or interrupted. In some embodiments, the communication session may be a web session or an IM session.

When a communication session becomes inactive, ACD system 34a may take suitable measures to remove from agent 48 access to customer information database 64. In one embodiment, controller 46 may tell database manager 62 that agent 48 is no longer authorized to access caller 66 information in the customer information database 64. In another embodiment, the session key $K_s$ may be withdrawn or erased from the ACD system 34a. In this case, database manager 62 may lose one of the keys required to access customer information database 64, and the database manager 62 may shut down access of customer information database 64 to agent 48. In another embodiment, caller 66 may issue a disconnect command to disconnect agent's access to secure caller information. It should also be understood that a disconnect command in accordance with various embodiments may be issued in any suitable manner, such as through IM, short message service (SMS), e-mail, web form sharing, spoken such as by phone, in-band or out-of-band DTMF signals, or soft keys. In response to receiving this disconnect command, the ACD system 34a may remove agent's access to secure caller information. In this embodiment, agent's access may be disconnected by destroying session key $K_s$, removing agent's authenticating credentials, or through other suitable method of removing access to database 64. In certain embodiments, when agent 48 loses access to customer information database 64, controller 46 sends a refresh or other suitable command to the agent's screen to erase all caller 66 data from agent's display and temporary memory. In one embodiment, files holding caller 66 data may be deleted when agent 48 looses access to customer information database 64.

In some embodiments, caller 66 may have discretion to remove access from agent 48 to customer information database 64 at any time. In one example, caller 66 may remove access to customer information database 64 by disconnecting or interrupting the active communication session between caller 66 and agent 48, which destroys session key $K_s$. In another example, caller 66 may notify controller 46 that caller 66 no longer wants agent 48 to have access to secure information of caller 66. For example, caller 66 may shut down access to customer information database 64 by hitting a designated key notifying controller 46 to remove access from agent 48. In this example, caller 66 may not need to disconnect from active communication session to remove access to customer information database 64.

In some embodiments, ACD system 34a may routinely check to confirm that the required keys are present to maintain access to customer information database 64. In one case, if any of the participants is no longer present in the communication session, the session key $K_s$ may be destroyed and access to customer information database 64 removed. In another case, a supervisor or other system module may destroy a required key and access to customer information database 64 may be removed. For example, if the supervisor feels that agent 48 has abused security requirements, the supervisor may remove agent key $K_a$. The communication session may continue so that agent 48 may end the call, but agent 48 may not have access to any secure information in customer information database 64.

In some embodiments, ACD system 34a may grant agent 48 access to information in customer information database 64 once ACD system 34a has accessed the required authentication information. Information from customer information database 64 may be given to agent 48 in any reasonable form. In one case, the information may be presented to agent 48 via a screen pop and may remain on agent's display as long as agent 48 remains actively in a communication session with caller 66. As soon as the communication session ends, the database session may terminate and the information may be wiped off agent's screen.

In some embodiments, ACD system 34a may restrict access to certain types of information in customer information database 64. For example, agent 48 may only have access to information of caller 66 in customer information database 64. In another example, access to customer database 64 may be restricted to secure information of caller 66 and non-secure information. In another example, access may be further limited by rule-based logic. For example, certain agents 48 such as nurses may be restricted to accessing health information and restricted from accessing billing information. In another example, accounting agents 48 may not have access to health information when the call involves billing. Access to information in customer information database 64 may be restricted in other ways that will be recognized by those of ordinary skill in the art.

In some embodiments, caller 66 may restrict agent's access to specific information in the customer information database 64 or may not want agent 48 to have access any information in customer information database 64. For example, caller 66 may be calling the contact center to get general information about the company. In this example, access to customer information database 64 may not be required and caller 66 may not want agent to have access to customer information database 64. In another example, ACD system 34a may notify caller 66 of information that is about to be accessed by agent 48. In this example, caller 66 may be given the option of removing some of the information before it is sent to the agent.

In some embodiments, caller 66 may be given information regarding the handling of their confidential information so that caller 66 can make an informed decision to restrict and/or remove access of agent 48 to information in customer information database 64. In one example, the ACD system 34a may inform the customer of all agent 48 actions including which screen or information agent 48 views, which control keys agent 48 presses (e.g. print screen, etc.), and which transactions agent 48 performs. In another example, the ACD system 34a may notify caller 66 that the call is being sent to an agent 48 in foreign country. In one embodiment, the activities of agents 48 may be reported to caller 66 via a combination of Text Speech (TTS) and prompts or via web sharing. For example, caller 66 may subscribe to an IM or TTS stream.

In another embodiment, controller 46 may communicate to caller 66 the actions performed by agents 48 in handling the secure caller information. In this embodiment, controller 46 may communicate these actions performed by agents 48 using any suitable communication method such as whisper feature, form, special graphical user interface (GUI), TTS, prompts, instant message or email. In many cases, caller 66 is notified of every activity of agent 48 by a system module other than agents 48. For example, if agent 48 tries to print the screen, controller 46 may notify caller 66 that "agent just printed screen contents." In another example, if agent 48 moves from the savings account to the checking account screen, a controller may notify caller 66 that "agent is now viewing your checking account." If caller 66 does not like any of the actions taken by ACD agent 48, caller 66 may disconnect and controller 46 may immediately remove access of agent 48 to the information. In some cases, agent 48 display may be cleared of caller's information and/or files deleted.

In some embodiments, caller 66 may be required to approve of each instance of agent's access to information in customer information database 64. In one embodiment, when agent 48 attempts to access caller's checking account information in customer information database 64, ACD system 34a may prompt caller 66 for approval. For example, ACD system 34a may notify caller that "to complete the transaction the agent needs your approval to access your checking account information. To approve agent access, please press 1; to deny agent access, please press 2."

Figure 3A:
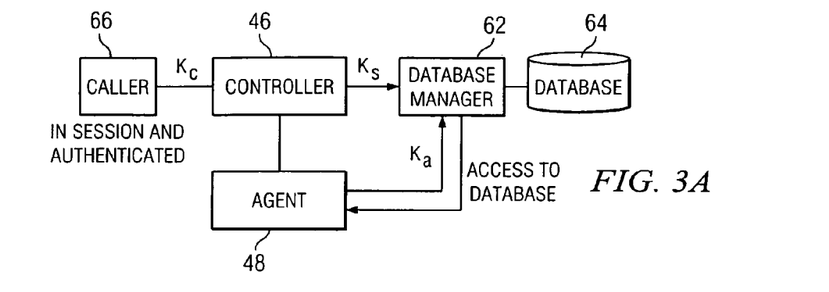
FIG. 3 illustrates several schematics for granting access to caller information in customer information databases using access authentication information, in accordance with embodiments of the present invention.

FIG. 3A illustrates a schematic that includes caller 66, controller 46, agent 48, database manager 62, and customer information database 64. In the illustrated embodiment, access authentication information includes both agent key $K_a$ and session key $K_s$. In some cases, the presence of agent key $K_a$ and session key $K_s$ may be required to maintain access to customer information database 64. For example, if the agent key $K_a$ is destroyed, access to customer information database 64 may be removed.

In the illustrated embodiment, controller 46 or other system module generates caller key $K_c$ when caller 66 provides authenticating credentials to ACD system 34a. Authenticating credentials may include any combination of identity or other authenticating information used by ACD system 34a to authenticate caller 66. In one example, ACD system 34a may require that caller 66 provide a mother's maiden name as an authenticating credential. In another example, ACD system 34a may require that caller 66 provide an account number and password or PIN as authentication credentials. The password and the associated session ID may be encrypted and saved in customer information database of ACD system 34a. In certain embodiments, ACD system 34a may prompt caller 66 to provide authenticating credentials. ACD system 34a may prompt caller 66 before or during the active communication between caller 66 and agent 48.

In the illustrated embodiment, controller 46 or other system module generates session key $K_s$ once caller 66 and agent 46 are in an active communication session together and controller 46 has received caller key $K_c$. In this embodiment, controller 46 or other system module generates agent key $K_a$ when agent 48 provides authenticating credentials to ACD system 34*a*. In one example, agent 48 may provide authenticating credentials such as a password or PIN when logging into ACD system 34*a*. In the illustrated embodiment, agent 48 or other system module passes agent key $K_a$ to database manager 62. In response to receiving agent key $K_a$ and session key $K_s$, database manager 62 may grant agent 48 access to information in customer information database 64.

In some embodiments, ACD system 34*a* may withhold or revoke authenticating credentials, which may destroy at least one key and remove or prevent access from information in customer information database 64. In one embodiment, system 34*a* may revoke the agent's authorization, which destroys the agent's key $K_a$ and removes the agent's access to information in customer information database 64. For example, a call may be transferred from agent A to agent B. In this example, controller 46 may revoke agent A's authorization to access customer information database 64 and add agent B's authorization to access customer information database 64. In one case, controller 46 may recall session key $K_s$ from database manager 62, create a new session key $K_s$ for agent B, and deliver the new session key $K_s$ to database manager 62.

In some embodiments, passing keys may be secured using the authenticating credentials of the recipient. For example, passing session key $K_s$ to database manager 62 may be secured using database manager 62 credentials. In another example, passing the session key $K_s$ to agent 48 may be secured using agent 48 credentials.

Figure 3B:
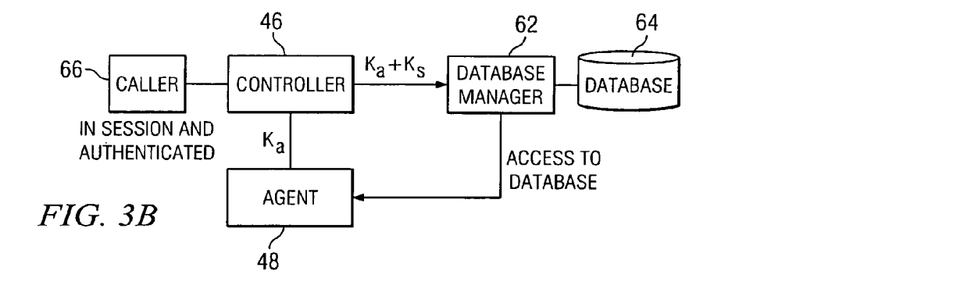

FIG. 3B illustrates a schematic that includes caller 66, controller 46, agent 48, database manager 62, and customer information database 64. In the illustrated embodiment, access authentication information includes both agent key $K_a$ and session key $K_s$. In some cases, the presence of agent key $K_a$ and session key $K_s$ may be required to maintain access to customer information database 64. For example, if the agent key $K_a$ is destroyed, access to customer information database 64 may be removed.

In the illustrated embodiment, controller 46 or other system module generates agent key $K_a$ when agent 48 provides authenticating credentials to ACD system 34*a*. In one example, agent 48 may provide authenticating credentials such as a password or PIN when logging into ACD system 34*a*. In the illustrated embodiment, controller 46 or other system module passes agent key $K_a$ to database manager 62.

In the illustrated embodiment, controller 46 or other system module generates session key $K_s$ once caller 66 and agent 48 are in an active communication session together. In the embodiment, session key $K_s$ and agent key $K_a$ are passed to database manager 62. In this embodiment, in response to receiving agent key $K_a$ and session key $K_s$, database manager 62 grants agent 48 access to information in customer information database 64.

Figure 3C:
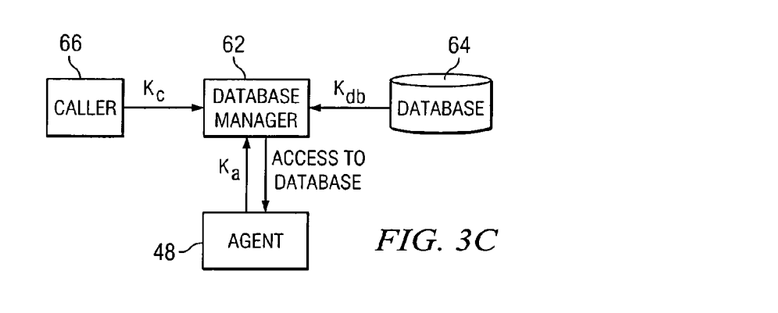

FIG. 3C illustrates a schematic that includes caller 66, agent 48, database manager 62, and customer information database 64. In the illustrated embodiment, access authentication information includes an agent key $K_a$, a caller key $K_c$, and a database key $K_{db}$. In some cases, the presence of all three keys may be required to maintain access to customer information database 64.

In the illustrated embodiment, database manager 62 or other system module generates caller key $K_c$ and agent key $K_a$ when ACD system 34*a* when agent 48 and caller 66 are in an active communication session and have been authenticated. In this embodiment, database manager 62 or other system module also generates a database key $K_{db}$. In one case, customer information database 64 may generate database key $K_{db}$ if a database communication session between agent 48 and customer information database 64 is active. A database communication session may include giving the agent or other system user access to a database to retrieve, save, store, or manage or other information in the database. In another embodiment, customer information database 64 generates database key $K_{db}$ when customer information database 64 is online. Once all three keys are present, database manager 62 will grant access to agent 48 to information in customer information database 64. In one case, database manager 62 may remove access to customer information database 64 when either caller 66, agent 48, or customer information database 64 leaves a communication session.

Figure 3D:
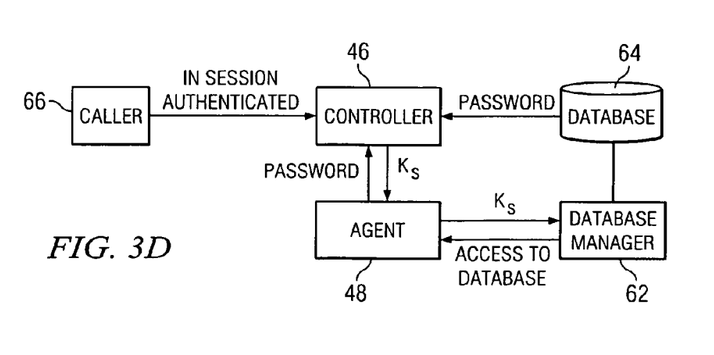

FIG. 3D illustrates a schematic that includes caller 66, controller 46, agent 48, database manager 62, and customer information database 64. In the illustrated embodiment, access authentication information includes a session key $K_s$ which ties together the communication session between caller 66 and agent 48, and authenticating credentials from caller 66, customer information database 64, and agent 48. In this embodiment, authenticating credentials may include a password. For example, authenticating credentials from customer information database 64 may include a database password. In another example, the authenticating credentials from agent 48 may include an agent password. In one case, agent 48 may give the agent password to ACD system 34*a* upon logging into the ACD system 34*a*.

In the illustrated embodiment, controller 46 or other system module generates a session key $K_s$ when agent 48, caller 66, and customer information database 64 are in a communication session and agent 48, caller 66, and customer information database 64 have submitted authenticating credentials. In one embodiment, if any participant leaves the active communication session, session key $K_s$ may be destroyed and access to customer information database 64 removed. In the illustrated embodiment controller 46 passes session key $K_s$ to agent 48 and agent 48 passes the session key $K_s$ to database manager 62 to gain access to information in customer information database 64.

It will be recognized by those of ordinary skill in the art that the schematics shown in FIG. 3 are merely examples of configurations for generating and passing keys in the ACD system 34*a* to access customer information database 64 in accordance with particular embodiments. Access to customer information database 64 may require any number of keys, participants in a session, and other authenticating credentials to accomplish the functionality and features described herein. In addition, one or more of the components of the schematics may work together in performing various functionality described herein.

Figure 4:
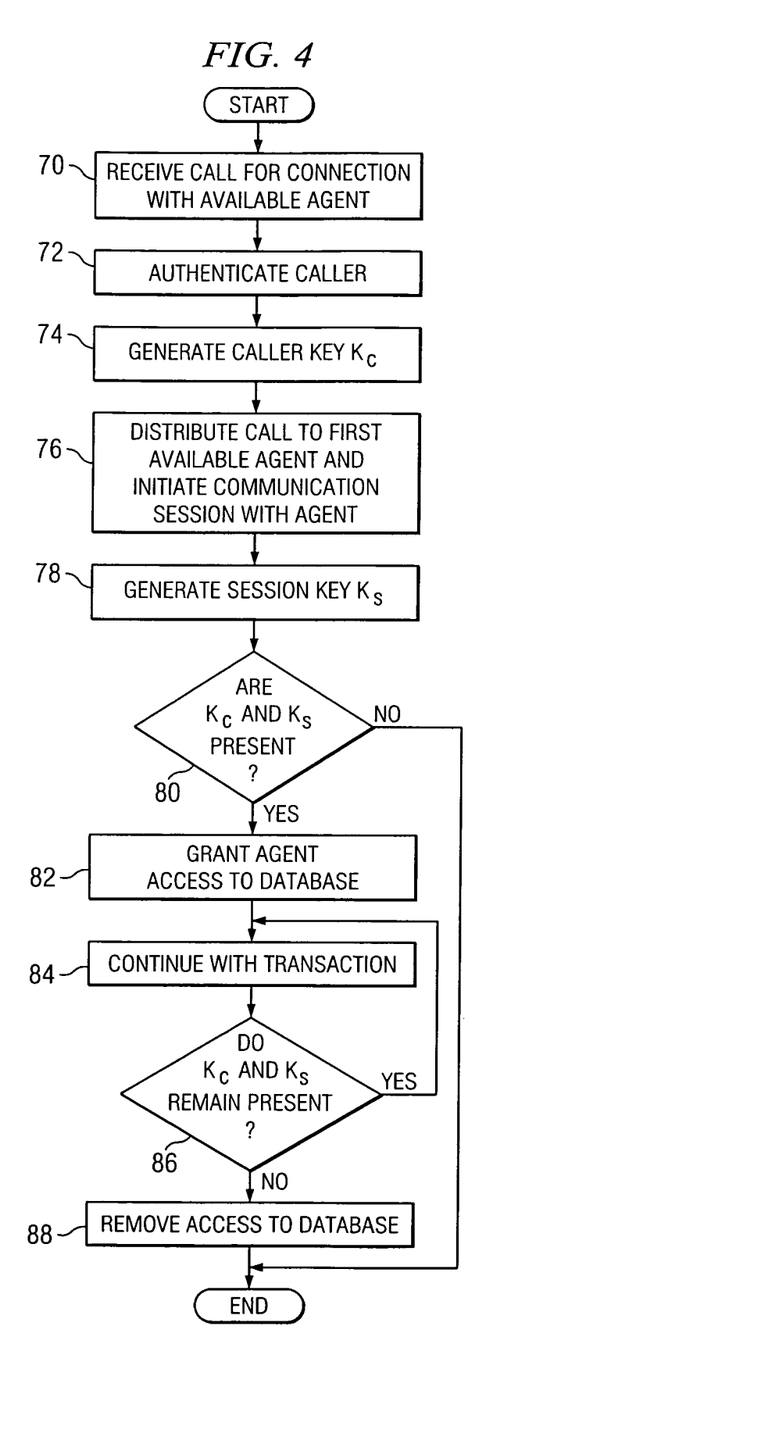
FIG. 4 illustrates a method for granting access to secure caller information in a customer database of an ACD system, in accordance with a particular embodiment of the present invention.

FIG. 4 illustrates a method for granting access to secure caller information in a customer database of an ACD system, in accordance with a particular embodiment of the present invention. In particular embodiments, the ACD system may be located at a call center or other service center. The method begins at step 70 where a call is received for connection with agent 48. In this embodiment, the call is received by ACD system 34*a*. In some cases, distributor 56 or other ACD system module may place caller 66 in queue 54 waiting for an available agent 48.

At step 72, caller 66 provides authenticating credentials to ACD system 34*a*. At step 74, a system module such as controller 46 generates caller key $K_c$ in response to caller 66 providing authenticating credentials. At step 76, the call is distributed to a first agent to handle the call. This first agent 48 may be selected by ACD system 34*a* out of a plurality of agents associated with ACD system 34*a*. Also, at step 76, a communication session between agent 48 and caller 66 is initiated. In particular embodiments, the session may include other participants such as customer information database 64 or a supervisor.

At step 78, a system module such as controller 46 generates session key $K_s$ in response to the presence of an active communication session between agent 48 and caller 66. In some embodiments, session key $K_s$ may be destroyed if caller 66 interrupts or disconnects the call.

At step 80, it is determined whether the required access authentication information including $K_c$ and $K_s$ is present. If the authentication information, $K_c$ and $K_s$, is present, ACD system 34*a* may grant access to customer information database 64 at step 82. If either key is removed or destroyed, agent's access to customer information database 64 may be removed at step 88. At step 84, agent 48 continues with the call transaction using information from customer information database 64.

At step 86, system 34*a* checks to make sure that both caller key $K_c$ and session key $K_s$ remain present as the transaction progresses. If it is determined that both keys are present, agent 48 continues with the transaction at step 84. In this embodiment, agent continues to have access to customer information database 64 as long as caller key $K_c$ and session key $K_s$ are active. If it is determined that one or both of the keys is no longer present at step 86, the system will remove access to customer information database 64 in step 88. In one embodiment, the communication session may remain open when the access to the customer information database 64 is terminated. In another embodiment, the display of agent 48 may be wiped clean of caller's information.

It should be understood that the architecture and functionality of ACDs and call centers described above is applicable generally to all call or contact centers that operate to answer incoming calls, make outgoing calls, identify appropriate agents 48*a-d* to receive the calls, and authorize access to databases. Accordingly, the described ACDs may include those call or contact centers that are located within an enterprise and are staffed by enterprise employees. ACDs implementing various functionalities described herein are not intended to be limited to hosted and outsourced call or contact centers.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for granting access to secure caller information, comprising:
   receiving from a caller a call for connection with one of a plurality of agents associated with an automatic call distribution system;
   distributing the call to an agent of the plurality of agents;
   initiating an active communication session between the caller and the agent for handling the call;
   automatically, in response to the initiation of the active communication session between the caller and the agent, granting to the agent access to secure caller information stored at the automatic call distribution system independently from the caller using a plurality of access authentication information, the plurality of access authentication information comprising the active communication session between the caller and the agent;
   receiving a disconnect command from the caller to disconnect from the agent the access to the secure caller information stored at the automatic call distribution system independently from the caller while maintaining the active communication session; and
   in response to receiving the disconnect command from the caller, removing from the agent the access to the secure caller information; and
   wherein removing from the agent the access to the secure information comprises the secure caller information from a display associated with the agent.

2. The method of claim 1, further comprising:
   disconnecting the active communication session between the caller and the agent; and
   in response to disconnecting the active communication session between the caller and the agent, removing from the agent the access to the secure caller information.

3. The method of claim 2, wherein:
   granting to the agent the access to secure caller information comprising establishing a database communication session between the agent and a database comprising the secure caller information; and
   removing from the agent the access to the secure caller information comprises disconnecting the database communication session between the agent and the database.

4. The method of claim 2, wherein removing from the agent the access to the secure caller information further comprises clearing the secure caller information from a display associated with the agent.

5. The method of claim 2, wherein disconnecting the active communication session between the caller and the agent, further comprises completing the transaction associated with the call.

6. The method of claim 1, further comprising communicating to the caller actions performed by the agent in handling the secure caller information.

7. The method of claim 6, wherein communicating to the caller actions performed by the agent in handling the secure caller information comprises communicating the actions using at least one of a text to speech, a prompt, or a whisper technique.

8. The method of claim 1, wherein the access authentication information further comprises caller authenticating credentials received from the caller.

9. The method of claim 1, wherein the access authentication information further comprises agent authenticating credentials received from the agent.

10. A method for granting access to secure caller information, comprising:
    receiving from a caller:
       a call for connection with one of a plurality of agents associated with an automatic call distribution system; and
       caller authenticating credentials associated with the caller;
    distributing the call to an agent of the plurality of agents;
    initiating an active communication session between the caller and the agent for handling the call;
    generating a session key for the communication session between the caller and the agent, the session key expiring at the end of the communication session;
    automatically, in response to the initiation of the active communication session between the caller and the agent, providing the agent with access to secure caller information of the caller stored at an automatic call distribution system database independently from the caller prior to the receipt of the call from the caller, the access to the secure caller information provided to the agent using the caller authenticating credentials and the session key;

receiving a disconnect command from the caller to disconnect from the agent the access to the secure caller information stored at the automatic call distribution system database independently from the caller while maintaining the active communication session;

in response to receiving the disconnect command from the caller, removing from the agent the access to the secure caller information; and wherein removing from the agent the access to the secure caller information comprises clearing the secure caller information from a display associated with the agent.

11. A system for granting access to secure caller information, comprising:

an interface operable to receive from a caller a call for connection with one of a plurality of agents associated with an automatic call distribution system; and a controller operable to:

distribute the call to an agent of the plurality of agents;

initiate an active communication session between the caller and the agent for handling the call;

automatically, in response to the initiation of the active communication session between the caller and the agent, grant to the agent access to secure caller information stored at the automatic call distribution system independently from the caller using a plurality of access authentication information, the plurality of access authentication information comprising the active communication session between the caller and the agent;

receive a disconnect command from the caller to disconnect from the agent the access to the secure caller information stored at the automatic call distribution system independently from the caller while maintaining the active communication session; and in response to receiving the disconnect command from the caller, remove from the agent the access to the secure caller information; and wherein the controller operable to remove from the agent the access to the secure caller information comprises a controller operable to clear secure caller information from a display associated with the agent.

12. The system of claim 11, wherein the controller is further operable to:

disconnect the active communication session between the caller and the agent; and in response to disconnecting the active communication session between the caller and the agent, remove from the agent the access to the secure caller information.

13. The system of claim 12, wherein:

the controller operable to grant to the agent access to secure caller information comprises a controller operable to establish a database communication session between the agent and a database comprising the secure caller information; and the controller operable to remove from the agent the access to the secure caller information comprises a controller operable to disconnect the database communication session between the agent and the database.

14. The system of claim 12, wherein the controller operable to remove from the agent the access to the secure caller information comprises a controller operable to clear the secure caller information from a display associated with the agent.

15. The system of claim 12, wherein the controller operable to disconnect the active communication session comprises a controller operable to complete the transaction associated with the call.

16. The system of claim 11, wherein the interface is further operable to communicate to the caller actions performed by the agent in handling the secure caller information.

17. The system of claim 16, wherein the interface operable to communicate to the caller actions performed by the agent in handling the secure caller information comprises an interface operable to communicate the actions using at least one of a text to speech, a prompt, or a whisper technique.

18. The system of claim 11, wherein:

the access authentication information further comprises caller authenticating credentials received from the caller; and the interface is further operable to receive from the caller the caller authenticating credentials.

19. The system of claim 11, wherein:

the access authentication information further comprises agent authenticating credentials received from the agent; and the interface is further operable to receive from the agent the agent authenticating credentials.

20. A system for granting access to secure caller information, comprising:

an interface operable to receive from a caller:

a call for connection with one of a plurality of agents associated with an automatic call distribution system; and caller authenticating credentials associated with the caller;

a controller operable to:

distribute the call to an agent of the plurality of agents;

initiate an active communication session between the caller and the agent for handling the call;

generate a session key for the communication session between the caller and the agent, the session key expiring at the end of the communication session;

automatically, in response to the initiation of the active communication session between the caller and the agent, provide the agent with access to secure caller information of the caller stored at an automatic call distribution system database independently from the caller prior to the receipt of the call from the caller, the access to the secure caller information provided to the agent using the caller authenticating credentials and the session key;

receive a disconnect command from the caller to disconnect from the agent the access to the secure caller information stored at the automatic call distribution system database independently from the caller while maintaining the active communication session;

in response to receiving the disconnect command from the caller, remove from the agent the access to the secure caller information; and wherein the controller operable to remove from the agent the access to the secure caller information comprises a controller operable to clear the secure caller information from a display associated with the agent.

21. Logic embodied in a non-transitory computer readable medium, the non-transitory computer readable medium comprising code operable to:

receive from a caller a call for connection with one of a plurality of agents associated with an automatic call distribution system;

distribute the call to an agent of the plurality of agents;

initiate an active communication session between the caller and the agent for handling the call;

automatically, in response to the initiation of the active communication session between the caller and the agent, grant to the agent access to secure caller information stored at the automatic call distribution system independently from the caller using a plurality of access authentication information, the plurality of access authentication information comprising the active communication session between the caller and the agent; and receive a disconnect command from the caller to disconnect from the agent the access to the secure caller information stored at the automatic call distribution system independently from the caller while maintaining the active communication session;

in response to receiving the disconnect command from the caller, remove from the agent the access to the secure caller information; and wherein the code operable to remove from the agent the access to the secure caller information comprises code operable to clear the secure caller information from a display associated with the agent.

22. The medium of claim 21, wherein the code is further operable to:

disconnect the active communication session between the caller and the agent; and in response to disconnecting the active communication session between the caller and the agent, remove from the agent the access to the secure caller information.

23. The medium of claim 22, wherein:

code operable to grant to the agent the access to secure caller information comprises code operable to establish a database communication session between the agent and a database comprising the secure caller information; and code operable to remove from the agent the access to the secure caller information comprises code operable to disconnect the database communication session between the agent and the database.

24. The medium of claim 22, wherein code operable to remove from the agent the access to the secure caller information further comprises code operable to clear the secure caller information from a display associated with the agent.

25. The medium of claim 22, wherein code operable to disconnect the active communication session between the caller and the agent, further comprises code operable to complete the transaction associated with the call.

26. The medium of claim 21, wherein the code is further operable to communicate to the caller actions performed by the agent in handling, the secure caller information.

27. The medium of claim 26, wherein code operable to communicate to the caller actions performed by the agent in handling the secure caller information comprises code operable to communicate the actions using at least one of a text to speech, a prompt, or a whisper technique.

28. The medium of claim 21, wherein the access authentication information further comprises caller authenticating credentials received from the caller.

29. The medium of claim 21, wherein the access authentication information further comprises agent authenticating credentials received from the agent.

30. Logic embodied in a non-transitory computer readable medium, the computer readable medium comprising code operable to:

receive from a caller:
a call for connection with one of a plurality of agents associated with an automatic call distribution system; and
caller authenticating credentials associated with the caller;

distribute the call to an agent of the plurality of agents;

initiate an active communication session between the caller and the agent for handling the call;

generate a session key for the communication session between the caller and the agent, the session key expiring at the end of the communication session;

automatically, in response to the initiation of the active communication session between the caller and the agent, provide the agent with access to secure caller information of the caller stored at an automatic call distribution system database independently from the caller prior to the receipt of the call from the caller, the access to the secure caller information provided to the agent using the caller authenticating credentials and the session key;

receive a disconnect command from the caller to disconnect from the agent the access to the secure caller information stored at the automatic call distribution system database independently from the caller while maintaining the active communication session;

in response to receiving the disconnect command from the caller, remove from the agent the access to the secure caller information; and wherein the code operable to remove from the agent the access to the secure caller information comprises code operable to clear the secure caller information from a display associated with the agent.

31. A system for granting access to secure caller information, comprising:

means for receiving from a caller a call for connection with one of a plurality of agents associated with an automatic call distribution system;

means for distributing the call to an agent of the plurality of agents;

means for initiating an active communication session between the caller and the agent for handling the call;

means for automatically, in response to the initiation of the active communication session between the caller and the agent, granting to the agent access to secure caller information stored at the automatic call distribution system independently from the caller using a plurality of access authentication information, the plurality of access authentication information comprising the active communication session between the caller and the agent;

means for receiving a disconnect command from the caller to disconnect from the agent the access to the secure caller information stored at the automatic call distribution system independently from the caller while maintaining the active communication session;

means for, in response to receiving the disconnect command from the caller, removing from the agent the access to the secure caller information; and wherein means for removing from the agent the access to the secure caller information comprises means for clearing the secure caller information from a display associated with the agent.

32. A method for granting access to secure caller information, comprising:

receiving from a caller:
   a call for connection with one of a plurality of agents associated with an automatic call distribution system; and
   caller authenticating credentials associated with the caller;

distributing the call to an agent of the plurality of agents;

receiving from the agent authenticating credentials associated with the agent;

initiating an active communication session between the caller and the agent for handling the call;

generating a session key for the active communication session between the caller and the agent, the session key expiring at the end of the communication session;

automatically, in response to the initiation of the active communication session between the caller and the agent, providing the agent with access to secure caller information of the caller stored at an automatic call distribution system database independently from the caller prior to the receipt of the call from the caller, the access to the secure caller information provided to the agent using a plurality of access authentication information, the plurality of access authentication information comprising:
   caller authenticating credentials;
   agent authenticating credentials; and
   session key;

communicating to the caller actions performed by the agent in handling the secure caller information;

receiving a disconnect command from the caller to disconnect from the agent the access to the secure caller information stored at the automatic call distribution system database independently from the caller while maintaining the active communication session; and in response to receiving the disconnect command from the caller:
   destroying the session key;
   removing from the agent the access to the secure caller information; and
   clearing the secure caller information from a display associated with the agent.

\* \* \* \* \*